United States Patent
Mardh et al.

(10) Patent No.: US 10,625,773 B2
(45) Date of Patent: Apr. 21, 2020

(54) STEER TORQUE MANAGER FOR AN ADVANCED DRIVER ASSISTANCE SYSTEM OF A ROAD VEHICLE

(71) Applicant: VOLVO CAR CORPORATION, Gothenburg (SE)

(72) Inventors: Lars Johannesson Mardh, Torslanda (SE); Malin Haglund, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 22 days.

(21) Appl. No.: 15/918,139

(22) Filed: Mar. 12, 2018

(65) Prior Publication Data

US 2018/0265120 A1 Sep. 20, 2018

(30) Foreign Application Priority Data

Mar. 17, 2017 (EP) ..................... 17161563

(51) Int. Cl.
*B62D 5/04* (2006.01)
*B62D 1/28* (2006.01)
(Continued)

(52) U.S. Cl.
CPC ............ *B62D 5/0463* (2013.01); *B62D 1/28* (2013.01); *B62D 1/286* (2013.01); *B62D 6/002* (2013.01);
(Continued)

(58) Field of Classification Search
CPC .................................................. B62D 5/0463
See application file for complete search history.

(56) References Cited

U.S. PATENT DOCUMENTS 5,270,708 A * 12/1993 Kamishima ........ G01C 21/3697
340/905
5,765,116 A   6/1998 Wilson-Jones et al.
(Continued)

FOREIGN PATENT DOCUMENTS

| EP | 1291227 A2 | 3/2003 |
| EP | 2159777 A2 | 3/2010 |
| EP | 3106367 A1 | 12/2016 |

OTHER PUBLICATIONS

Extended European Search Report dated Sep. 19, 2017, Application No. 17161563.6-1755, Applicant Volvo Car Corporation, 5 Pages.
(Continued)

*Primary Examiner* — Alex C Dunn
(74) *Attorney, Agent, or Firm* — Brooks Kushman P.C.

(57) ABSTRACT

A steer torque manager (STM) for an advanced driver assistance system (ADAS) of a road vehicle and a method therefor. A driver in the loop functionality determines when to hand over control to a driver. A wheel angle controller uses an ADAS wheel angle request to produce an overlay torque request to be added to a torque request from an electrical power assisted steering. The STM is arranged to receive an assistance torque related signal. When driver assistance is provided by the ADAS, the STM is arranged to feed forward and subtract from the overlay torque request a feed forward signal scaled to be a scaled version of the assistance torque related signal, using a scale factor in the range from 0 to 1 that assumes a lower value if a measure of driver activity indicates high driver activity and a higher value if the measure indicates low driver activity.

12 Claims, 5 Drawing Sheets

(51) Int. Cl.
    *B62D 15/02*     (2006.01)
    *B62D 6/00*     (2006.01)
    *G05D 1/00*     (2006.01)
    *G05D 1/02*     (2020.01)

(52) U.S. Cl.
    CPC .......... *B62D 6/007* (2013.01); *B62D 15/025* (2013.01); *G05D 1/0061* (2013.01); *G05D 1/021* (2013.01)

(56) References Cited

U.S. PATENT DOCUMENTS

| | | | |
|---|---|---|---|
| 5,925,082 A | 7/1999 | Shimizu et al. | |
| 6,053,270 A | 4/2000 | Nishikawa et al. | |
| 6,178,365 B1 | 1/2001 | Kawagoe et al. | |
| 6,487,501 B1 | 11/2002 | Jeon | |
| 6,879,896 B2 | 4/2005 | Martens | |
| 8,118,126 B2 | 2/2012 | Rattapon et al. | |
| 8,121,760 B2 | 2/2012 | Ghoneim et al. | |
| 8,392,064 B2 | 3/2013 | Thrun et al. | |
| 9,002,579 B2* | 4/2015 | Kataoka | B62D 15/025 701/41 |
| 9,156,464 B2 | 10/2015 | Schuberth et al. | |
| 9,428,219 B2* | 8/2016 | Flehmig | B62D 6/002 |
| 9,499,202 B2 | 11/2016 | Lewis et al. | |
| 9,586,619 B1 | 3/2017 | Akatsuka et al. | |
| 9,731,755 B1* | 8/2017 | Moshchuk | B62D 1/28 |
| 10,464,603 B2 | 11/2019 | Mardh et al. | |
| 2001/0020902 A1* | 9/2001 | Tamura | G01C 21/3697 340/905 |
| 2002/0194016 A1* | 12/2002 | Moribe | G01C 21/3697 701/469 |
| 2003/0045982 A1 | 3/2003 | Kondo et al. | |
| 2004/0030670 A1* | 2/2004 | Barton | G01C 21/32 |
| 2004/0262063 A1 | 12/2004 | Kaufmann et al. | |
| 2005/0273262 A1* | 12/2005 | Kawakami | B62D 15/025 701/301 |
| 2006/0200289 A1* | 9/2006 | Chino | B62D 5/003 701/41 |
| 2007/0027583 A1* | 2/2007 | Tamir | G06Q 30/0283 701/1 |
| 2007/0198145 A1 | 8/2007 | Norris et al. | |
| 2008/0047775 A1 | 2/2008 | Yamazaki | |
| 2009/0319060 A1* | 12/2009 | Wojsznis | G05B 11/42 700/30 |
| 2010/0152952 A1 | 6/2010 | Lee et al. | |
| 2011/0055577 A1* | 3/2011 | Candelore | H04L 9/32 713/176 |
| 2012/0109465 A1 | 5/2012 | Svensson et al. | |
| 2012/0109466 A1 | 5/2012 | Svensson et al. | |
| 2012/0166032 A1* | 6/2012 | Lee | B60W 30/12 701/23 |
| 2013/0096778 A1* | 4/2013 | Goto | B62D 5/008 701/41 |
| 2015/0012182 A1* | 1/2015 | Flehmig | B62D 6/002 701/41 |
| 2015/0183460 A1* | 7/2015 | Oyama | B62D 15/025 701/41 |
| 2015/0344029 A1* | 12/2015 | Silvlin | B60W 30/08 701/36 |
| 2016/0207537 A1 | 7/2016 | Urano et al. | |
| 2016/0229447 A1* | 8/2016 | Wada | B62D 6/007 |
| 2016/0272197 A1* | 9/2016 | Hulten | B62D 6/003 |
| 2016/0362102 A1* | 12/2016 | Honda | B60K 1/02 |
| 2016/0375911 A1* | 12/2016 | Coelingh | B60W 50/14 701/23 |
| 2017/0088174 A1 | 3/2017 | Inoue et al. | |
| 2017/0106903 A1* | 4/2017 | Moretti | B62D 6/00 |
| 2017/0225686 A1* | 8/2017 | Takaso | G08G 1/167 |
| 2017/0232997 A1* | 8/2017 | Tsubaki | B62D 5/0409 180/443 |
| 2017/0282972 A1* | 10/2017 | Moretti | B62D 15/0265 |
| 2017/0291638 A1* | 10/2017 | Gupta | B60W 40/103 |
| 2017/0297621 A1* | 10/2017 | Bunderson | B62D 15/025 |
| 2017/0355396 A1 | 12/2017 | Varunjikar et al. | |
| 2018/0157221 A1* | 6/2018 | Anderson | G05B 13/024 |
| 2018/0229769 A1 | 8/2018 | Mardh et al. | |
| 2018/0265123 A1 | 9/2018 | Mardh et al. | |
| 2018/0265128 A1 | 9/2018 | Mardh et al. | |
| 2019/0241189 A1 | 8/2019 | Odate | |

OTHER PUBLICATIONS

Mardh, Lars Johannesson, United States Patent and Trademark Office, Non-Final Office Action for U.S. Appl. No. 15/888,879, dated Aug. 28, 2019.

European Patent Office, Extended European Search Report for European Application No. 17155512.1-1755, dated Jul. 6, 2017, 5 pages.

European Patent Office, Extended European Search Report for European Application No. 17161786.3-1755, dated Sep. 19, 2017, 9 pages.

European Patent Office, Extended European Search Report for European Application No. 17161795.4-1755, dated Sep. 20, 2017, 9 Pages.

U.S. Patent and Trademark Office, Notice of Allowance for U.S. Appl. No. 15/888,717, dated Sep. 23, 2019.

Mardh, et al., Amendment Under 37 C.F.R. § 1.111 for U.S. Appl. No. 15/888,879, filed Nov. 22, 2019.

Mardh et al. Amendment under 37 C.F.R. § 1.111 for U.S. Appl. No. 15/888,879, filed with the U.S. Patent and Trademark Office on Nov. 22, 2019.

U.S. Patent and Trademark Office, Notice of Allowance for U.S. Appl. No. 15/888,879, dated Dec. 18, 2019.

U.S. Patent and Trademark Office, Notice of Allowance for U.S. Appl. No. 15/920,019, dated Jan. 15, 2020.

* cited by examiner

STEER TORQUE MANAGER FOR AN ADVANCED DRIVER ASSISTANCE SYSTEM OF A ROAD VEHICLE

CROSS-REFERENCE TO RELATED APPLICATIONS

This application claims foreign priority benefits under 35 U.S.C. § 119(a)-(d) to European patent application number EP 17161563.6, filed Mar. 17, 2017, which is incorporated by reference in its entirety.

TECHNICAL FIELD

The present application relates to a steer torque manager for an advanced driver assistance system of a road vehicle having an electrical power assisted steering and a method in such a steer torque manager.

BACKGROUND

It is known to use power steering in road vehicles, e.g., electrical power assisted steering, commonly abbreviated as EPAS, in a road vehicle such as a car, lorry, bus or truck, wherein an electric motor assists a driver of the road vehicle by adding an assistive torque to e.g., a steering column or steering rack of the road vehicle.

It is further known to use advanced driver assistance systems, commonly abbreviated as ADAS, such as Lane Keeping Aid systems, commonly abbreviated as LKA systems, in order to help a road vehicle driver maintain the road vehicle in a desired lane. For LKA or lane centering systems where an EPAS is used, a steering wheel torque overlay, i.e., additional steering wheel torque on top of what would have been obtained by the base assist of the EPAS, is used for lateral position control.

However, the need for more advanced autonomous steering functions has put new requirements on current steering safety concepts. One example of such is commonly called Pilot Assist, commonly abbreviated as PA, which helps a driver to drive the vehicle within the road lane whilst at the same time maintaining a preselected time interval to a preceding vehicle.

Current safety mechanisms for driver assistance functions, such as PA functions, commonly rely on a driver to always hold his or her hands on the steering wheel. By holding the steering wheel, the driver will influence a wheel angle controller with a torque disturbance. When the driver is resting his or her hands on the steering wheel the torque disturbance depends on the biometrics of the driver as well as the numerous different ways different drivers might hold the steering wheel.

A Steer Torque Manager, commonly abbreviated as STM, is a component that includes a Driver In the Loop functionality, commonly abbreviated as DIL functionality, and a wheel angle controller. The DIL functionality usually relies on a torsion bar torque sensor to decide when and how to hand over control to the driver from the Pilot Assist- or Lane Keeping Aid-functionality and when the driver is to be treated as a disturbance that needs to be suppressed by the wheel angle controller. The DIL-functionality hands over control to the driver by limiting the torque output of the wheel angle controller, e.g., by scaling the output or by decreasing the maximum and minimum allowed overlay torque. The STM is commonly located in an EPAS supplier node, herein referred to as Power Steering Control Module, commonly abbreviated as PSCM.

Since a driver is required to keep his or her hands on the steering wheel the overall comfort and customer value of the PA functionality is largely decided by the DIL-functionality, which needs to handle two partly contradictory requirements. Firstly, the DIL-functionality and the wheel angle controller should be able to track a wheel angle request from the PA path while suppressing the torque disturbance from a driver that rests his or her hands on the steering wheel. Secondly, when the driver desires to take control of the vehicle, the DIL-functionality should comfortably hand over control to the driver, thereby assuring that the driver never experiences high torque in the steering wheel.

These two requirements are contradictory because the first requirement relies on being able to suppress steering wheel torque disturbances, while the second requirement means that the driver should never experience a large counteracting torque from the wheel angle controller.

When a driver rests his or her hands on the steering wheel, whilst shoulders and arms are rested, and whilst an advanced driver assistance system such as PA is active, steering wheel torques in the magnitude of 0.5-1.5 Nm could unintentionally be caused by a driver. Such unintentional disturbances from a driver will normally cause small movements of the steering wheel which in turn will cause short torque pulsations when counteracted by the wheel angle controller in the STM as it tries to compensate for the disturbance. In some cases, the driver will also feel the resulting lateral motion as this also may cause torque disturbances at a motor controller of a steering system of the road vehicle, e.g., up to approximately 0.15 Nm.

This is due to the fact that the EPAS assistance is high, which means that even low levels of torque on the steering wheel will cause movements. A torque request from the wheel angle controller is derived using an angle error, which means that the angle error happens first before the wheel angle controller increases the torque output and compensates for the EPAS assistance disturbance.

Thus, there is a need for improved solutions which are able to simultaneously handle both of the above requirements while facilitating fulfilment of high Automotive Safety Integrity requirements.

SUMMARY

Embodiments herein aim to provide an improved steer torque manager for an advanced driver assistance system of a road vehicle.

This is provided through a steer torque manager for an advanced driver assistance system of a road vehicle having an electrical power assisted steering, the steer torque manager comprising a driver in the loop functionality for determining when and how to hand over control from an advanced driver assistance system to a driver, a wheel angle controller for providing from an advanced driver assistance system wheel angle request an overlay torque request to be added to a torque request from the electrical power assisted steering, and the steer torque manager further being arranged to receive an assistance torque related signal, where the steer torque manager further, when driver assistance is provided by the advanced driver assistance system, is arranged to feed forward and subtract from the overlay torque request provided by the wheel angle controller a feed forward signal scaled in a feed forward functionality to be a scaled version of the assistance torque related signal, using a scale factor in the range [0,1] arranged to assume low values if the measure of driver activity indicates high driver activity and higher values if the measure of driver activity indicates low driver activity.

The provision of scaling a feed forward signal and subtracting it from an overlay torque request provided by the wheel angle controller, as above, provides for allowing a driver of an associated road vehicle to rest his or her hands on a steering wheel thereof without unintentional disturbances from the driver causing small movements of the steering wheel causing short torque pulsations in the steering, which provides for improved driver comfort when using an advanced driver assistance system, such as a pilot assist system.

According to a second embodiment it is provided that the assistance torque related signal is provided as a vehicle traveling velocity dependent amplification of a steering wheel torsion bar torque.

The provision of the assistance torque related signal as a vehicle traveling velocity dependent amplification of a steering wheel torsion bar torque provides for efficiently adapting the driver in the loop functionality to the vehicle traveling velocity.

According to a third embodiment it is provided that the steer torque manager further is arranged to use as the measure of driver activity a driver in the loop factor indicating driver activity from an inactive driver to a fully active driver.

The provision of using a driver in the loop factor, as above, is an efficient way to provide a measure of driver activity.

According to a fourth embodiment it is provided that the steer torque manager further is arranged to calculate the driver in the loop factor as a normalized version of a driver in the loop impulse, which it is arranged to calculate as a measure of driver activity over a time window where more recent values are weighted higher than older values, such that the driver in the loop factor spans between indicating an inactive driver and a fully active driver.

The provision of calculating the driver in the loop factor as above provides an efficient way of providing a useful indication of driver steering activity.

According to a fifth embodiment it is provided that the driver in the loop factor is arranged to span from 1 to 0 where 1 indicates an inactive driver and 0 indicates a fully active driver for whom the overlay torque request from an advanced driver assist functionality should be faded out and control handed over from an advanced driver assistance system to a driver.

The provision of arranging the driver in the loop factor to span from 1 to 0 as above provides an intuitive measure for indication of driver steering activity.

According to a sixth embodiment it is provided that the feed forward signal is arranged to be scaled in the feed forward functionality to be a scaled version of the assistance torque related signal, where the scale factor is ramped up continuously from zero to one in the range [0,1] in a nonlinear fashion with respect to the assistance torque related signal.

The provision of ramping-up the feed forward signal, as above, provides for enabling a smooth comfortable feeling when a driver of the road vehicle wishes to assume control of the steering.

According to a seventh embodiment it is provided that the driver in the loop factor is rate limited.

The provision of rate limiting the driver in the loop factor provides for further avoiding uncomfortable jerks in the steering wheel of an associated road vehicle.

According to an eighth embodiment it is provided that the steer torque manager is arranged to receive wheel angle requests from an advanced driver assistance system being a pilot assist system, arranged to help a driver of the road vehicle to drive within a road lane whilst at the same time maintaining a preselected time interval to a preceding vehicle.

The provision of an associated advanced driver assistance system being a pilot assist system, as above, provides for improved driver comfort when using such a pilot assist system.

According to a ninth embodiment it is provided that the steer torque manager further is arranged to subtract from the overlay torque request a feed forward signal scaled using a scale factor [1] for any assistance torque related signal caused by steering wheel torsion bar torques less than 1.5 Nm when the measure of driver activity indicates low driver activity.

The provision of subtracting from the overlay torque request a feed forward signal scaled using a scale factor [1], as above, provides for counteracting low levels of assistance torque that otherwise could be unintentionally caused by a driver holding his/her hands on a steering wheel while using an advanced driver assistance system, such as a pilot assist system.

According to a tenth embodiment is provided a power steering control module that comprises a steer torque manager as above.

The provision of a power steering control module that comprises a steer torque manager as above provides for allowing a driver to rest his or her hands on the steering wheel without unintentional disturbances from the driver causing small movements of the steering wheel causing short torque pulsations in the steering which provides for improved driver comfort when using an advanced driver assistance system, such as a pilot assist system.

According to an eleventh embodiment is provided an advanced driver assistance system that comprises a steer torque manager as above.

The provision of an advanced driver assistance system that comprises a steer torque manager as above provides for allowing a driver using the advanced driver assistance system to rest his or her hands on the steering wheel without unintentional disturbances from the driver causing small movements of the steering wheel causing short torque pulsations in the steering which provides for improved driver comfort when using an advanced driver assistance system, such as a pilot assist system.

According to a twelfth embodiment is provided a road vehicle that comprises an advanced driver assistance system as above.

The provision of a road vehicle that comprises an advanced driver assistance system as above provides for improved driver comfort when using an advanced driver assistance system, such as a pilot assist system.

According to a thirteenth embodiment is provided a method in a steer torque manager for an advanced driver assistance system of a road vehicle having an electrical power assisted steering, the steer torque manager comprising a driver in the loop functionality for determining when and how to hand over control from an advanced driver assistance system to a driver, a wheel angle controller for providing from an advanced driver assistance system wheel angle request an overlay torque request to be added to a torque request from the electrical power assisted steering, and the steer torque manager further being arranged to receive an assistance torque related signal, where the method comprises: if driver assistance is provided by the advanced driver assistance system having the steer torque manager feed forward and subtract from the overlay torque request provided by the wheel angle controller a feed forward signal scaled to be a scaled version of the assistance torque related signal, using a scale factor in the range [0,1] assuming low values if the measure of driver activity indicates high driver activity and higher values if the measure of driver activity indicates low driver activity.

A method as above provides for allowing a driver of an associated road vehicle to rest his or her hands on a steering wheel thereof without unintentional disturbances from the driver causing small movements of the steering wheel causing short torque pulsations in the steering which provides for improved driver comfort when using an advanced driver assistance system, such as a pilot assist system.

BRIEF DESCRIPTION OF THE DRAWINGS

In the following, embodiments herein will be described in greater detail by way of example only with reference to attached drawings.

Figure 1:
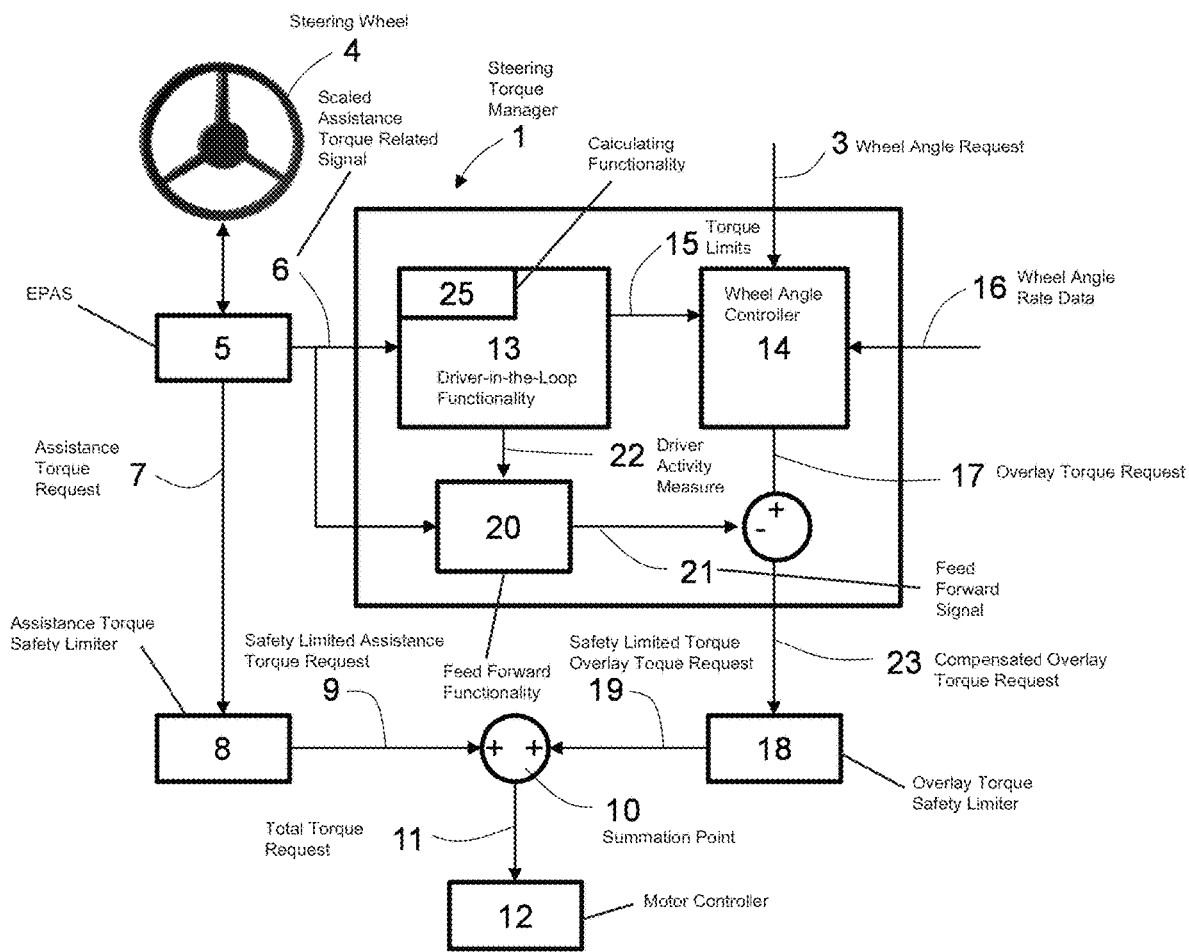
FIG. 1 is a schematic illustration of a steer torque manager for an advanced driver assistance system arranged in an electrical power assisted steering system of a road vehicle.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

This disclosure is based on the realization that it should be possible to provide an improved steer torque manager 1 for an advanced driver assistance system 26 of a road vehicle 2, which is able to track a wheel angle request 3 from an advanced driver assistance system path while suppressing a torque disturbance from a driver that rests his hands on a steering wheel 4 of the road vehicle 2.

Further that this should be possible whilst ensuring that, when a driver desires to take control of the road vehicle 2, control is comfortably handed over to the driver such that the driver never experiences high torque in the steering wheel 4.

This is, as illustrated in FIG. 1, provided through a steer torque manager 1, as described in the following, for an advanced driver assistance system 26 of a road vehicle 2 having an electrical power assisted steering (EPAS).

FIG. 1 illustrates schematically such a steer torque manager 1, where a steering wheel 4 torque applied by a driver of the road vehicle 2, and sensed by a steering wheel torque sensor 29, is used by an electrical power assisted steering (EPAS) assistance functionality 5 arranged to provide a steering wheel 4 torsion bar 28 torque related signal 6, representative of an assistance torque or basic steering torque (BST), and an assistance torque request 7. This assistance torque request 7 is normally identified as a QM hazard which does not dictate any safety requirements according to the Automotive Safety Integrity Level (ASIL) risk classification scheme defined by the ISO 26262—Functional Safety for Road Vehicles standard.

The assistance torque request 7 is subject to an assistance torque safety limiter 8 which in turn provide a safety limited assistance torque request 9 that fulfil Automotive Safety Integrity Level D, which is the highest classification of initial hazard (injury risk) defined within ISO 26262 and to that standard's most stringent level of safety measures to apply for avoiding an unreasonable residual risk.

This ASIL D compliant safety limited assistance torque request 9 is then brought to a summation point 10, which in turn provides a total torque request 11 to a motor controller 12 of a steering system 30 of the road vehicle 2.

The steer torque manager 1 comprises a driver in the loop functionality 13, to which driver in the loop functionality 13 the steering wheel 4 torsion bar 28 torque related signal 6, sometimes also referred to as basic steering torque (BST) signal, is provided. The driver in the loop functionality 13 uses this steering wheel 4 torsion bar 28 torque related signal 6 for determining when and how to hand over control from an advanced driver assistance system 26 to a driver.

The steer torque manager 1 also comprises a wheel angle controller 14, for providing from an advanced driver assistance system 26, wheel angle request 3 and torque limits 15, upper and lower, from the driver in the loop functionality 13, and usually also from wheel angle and wheel angle rate data 16, an overlay torque request 17.

The steer torque manager 1 is further, when driver assistance is provided by the advanced driver assistance system 26, arranged to feed forward and subtract from the overlay torque request 17 provided by the wheel angle controller 14 a feed forward signal 21.

The feed forward signal 21 is scaled in a feed forward functionality 20 to be a scaled version of the assistance torque related signal 6, using a scale factor is in the range [0,1] arranged to assume low values if a measure of driver activity 22 indicates high driver activity and higher values if the measure of driver activity 22 indicates low driver activity. The range [0,1], as used herein, relates to the interval from zero to one.

The resulting compensated overlay torque request 23 is also identified as a QM hazard which does not dictate any safety requirements, why it is also subject to an overlay torque safety limiter 18 which in turn provide a safety limited overlay torque request 19 that fulfil Automotive Safety Integrity Level D.

The safety limited overlay torque request 19 is then arranged to be added to the ASIL D compliant safety limited assistance torque request 9 from the electrical power assisted steering 5 at the summation point 10, which in turn provides a total torque request 11 to the motor controller 12 of the steering system 30 of the road vehicle 2.

Thus, through reducing the overlay torque request 17, as described above, it is possible to provide for allowing a driver of an associated road vehicle 2 to rest his or her hands on a steering wheel 4 thereof, without unintentional disturbances from the driver causing small movements of the steering wheel 4 causing short torque pulsations in the steering, which provides for improved driver comfort when using an advanced driver assistance system 26, such as a pilot assist system.

According to embodiments hereof the assistance torque related signal 6 is provided as a vehicle 2 traveling velocity dependent amplification of a steering wheel 4 torsion bar 28 torque. This provides for efficiently adapting the driver in the loop functionality to the vehicle traveling velocity.

In yet further embodiments the steer torque manager 1 is further arranged to use as the measure of driver activity 22 a driver in the loop factor indicating driver activity from an inactive driver to a fully active driver, which is an efficient way to provide a measure of driver activity when the steer torque manager 1 comprises a driver in the loop functionality 13.

According to still some embodiments the steer torque manager 1 is further arranged to calculate, using a calculating functionality thereof 25, the driver in the loop factor 22 as a normalized version of a driver in the loop impulse. The steer torque manager 1 is arranged to calculate the driver in the loop impulse as a measure of driver activity over a time window where more recent values are weighted higher than older values, such that the driver in the loop factor 22 spans between indicating an inactive driver and a fully active driver. This is an efficient way of providing a useful indication of driver steering activity.

In some such embodiments the driver in the loop factor 22 is arranged to span from 1 to 0 where 1 indicates an inactive driver and 0 indicates a fully active driver, for whom the overlay torque request 17 generated from an advanced driver assist functionality 26, wheel angle request 3 should be faded out and control handed over from an advanced driver assistance system 26 to a driver. Having the driver in the loop factor 22 to span from 1 to 0 as described above provides an intuitive and useful measure for indication of driver steering activity.

In yet some embodiments the feed forward signal 21 is arranged to be scaled in the feed forward functionality 20 to be a scaled version of the assistance torque related signal 6, where the scale factor is ramped up continuously from zero to one in the range [0,1] in a nonlinear fashion with respect to the assistance torque related signal 6. This is illustrated by the plotted curve 24 in FIG. 2, which illustrates how the feed forward signal 21 is derived in a nonlinear fashion from the assistance torque related signal 6 for different values of a driver in the loop factor 22 measure for indication of driver steering activity spanning from 1 to 0, as described above. Ramping-up the feed forward signal 21 in a nonlinear fashion provides for enabling a smooth comfortable feeling when a driver of the road vehicle 2 wishes to assume control of the steering, as increased driver activity will fade the feed forward signal 21 towards zero and thus removing the compensation previously provided for eliminating unintentional driver steering input when the driver was inactive and used an advanced driver assist functionality 26.

In yet some embodiments the driver in the loop factor 22 is rate limited, which provides for further avoiding uncomfortable jerks in the steering wheel 4 of the associated road vehicle 2.

Figure 2:
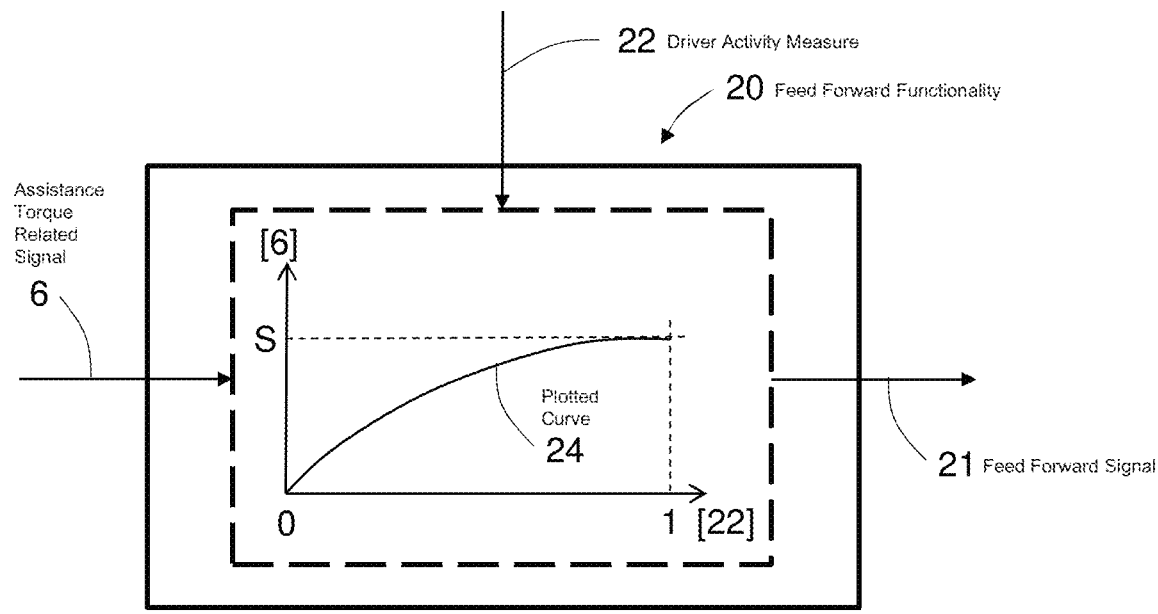
FIG. 2 is a schematic illustration in more detail of a feed forward functionality of the steer torque manager of FIG. 1.

Thus, as described above, through feeding forward a signal 21 continuously scaled to be a scaled version of the assistance torque related signal 6, using a scale factor in the range [0,1] arranged to assume low values if the measure of driver activity 22 indicates high driver activity and higher values if the measure of driver activity 22 indicates low driver activity, as illustrated in FIG. 2, and subtracting that feed forward signal 21 from the overlay torque request 17 provided by the wheel angle controller 14, it is possible to provide an improved steer torque manager 1 for an advanced driver assistance system 26 of a road vehicle 2, which is able to track a wheel angle request 3 from an advanced driver assistance system path while suppressing a torque disturbance from a driver that rests his hands on a steering wheel 4 of the road vehicle 2, whilst facilitating fulfilment of high Automotive Safety Integrity requirements.

Figure 4:
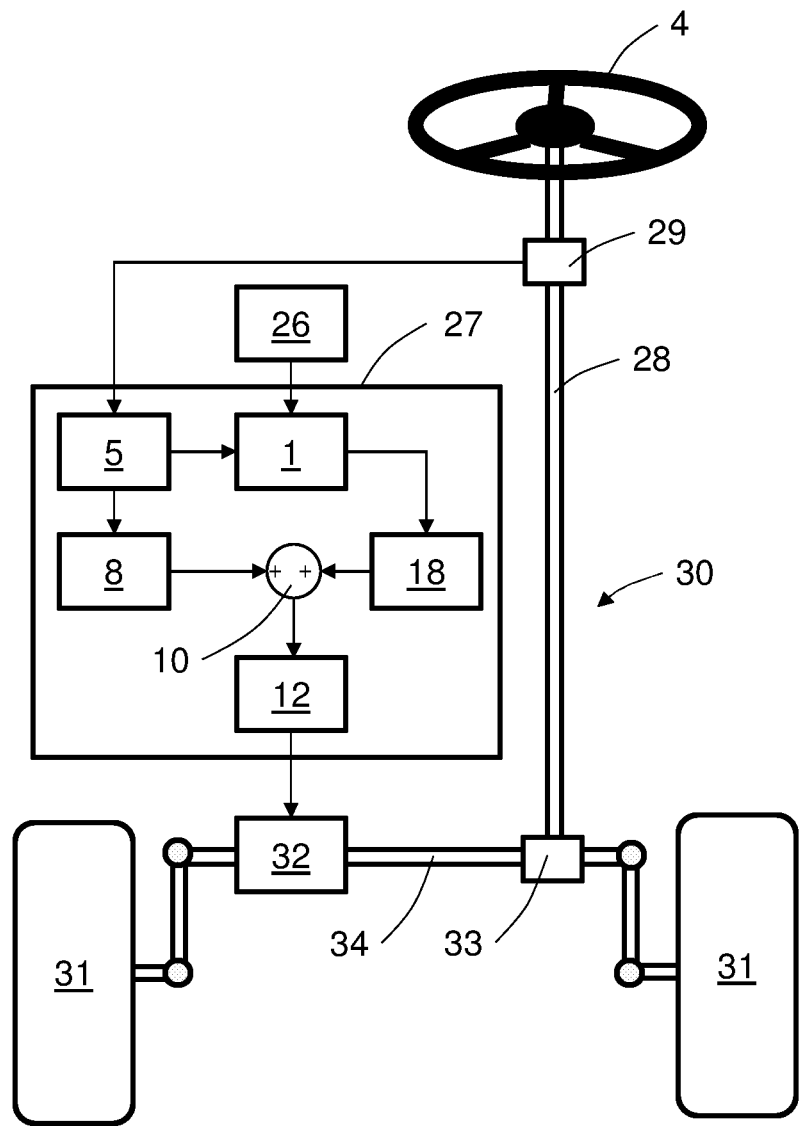
FIG. 4 is a schematic illustration of a vehicle steering system having a power steering control module that comprises a steer torque manager according to embodiments herein.

As illustrated schematically in FIG. 4, it is further envisaged herein a power steering control module 27 that comprises a steer torque manager 1 as above. The steering system 30 of the vehicle 2 comprises a steering wheel 4, connected to a steering rack 34 via a torsion bar 28, to which a steering wheel torque sensor 29 is arranged, and a pinion gear 33. The power steering control module 27 comprises the steer torque manager 1, which is arranged to control the overlay torque motor 32 of the steering system 30 of the road vehicle 2 to provide an overlay torque to steerable wheels 31 of the vehicle 1 steering system 30.

A power steering control module 27 that comprises a steer torque manager 1 as above provides for allowing a driver to rest his or her hands on the steering wheel 4 without unintentional disturbances from the driver causing small movements of the steering wheel that would otherwise cause short torque pulsations in the steering while the wheel angle controller 14 in the steer torque manager 1 tries to compensate for the disturbance. Thus, is provided for improved driver comfort when using an advanced driver assistance system, such as a pilot assist system.

Figure 5:
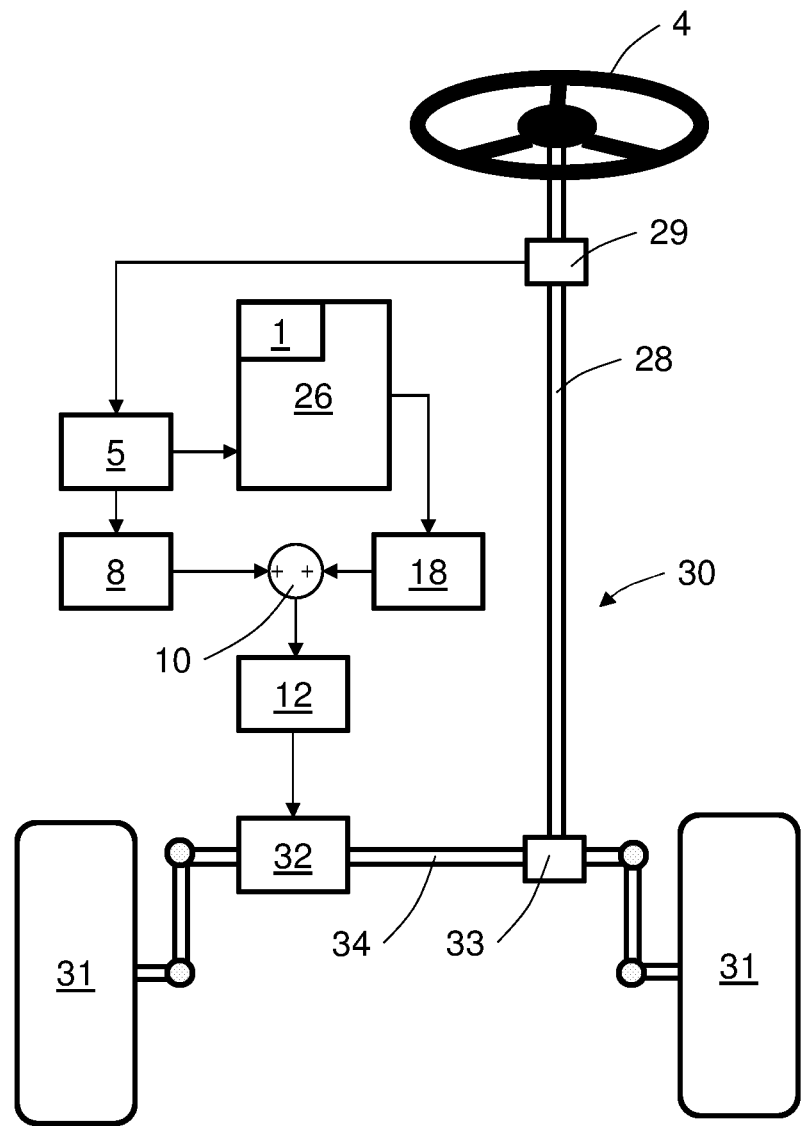
FIG. 5 is a schematic illustration of a vehicle steering system having an advanced driver assistance system that comprises a steer torque manager according to embodiments herein.

It is still further envisaged herein, as illustrated schematically in FIG. 5, an advanced driver assistance system 26 that comprises a steer torque manager 1 as above. As for FIG. 4, the steering system 30 of the vehicle 2 comprises a steering wheel 4, connected to a steering rack 34 via a torsion bar 28, to which a steering wheel torque sensor 29 is arranged, and a pinion gear 33.

An advanced driver assistance system 26 that comprises a steer torque manager 1 as described above provides for allowing a driver, using the advanced driver assistance system 26, to rest his or her hands on the steering wheel 4 without unintentional disturbances from the driver causing small movements of the steering wheel that would otherwise cause short torque pulsations in the steering while the wheel angle controller 14 in the steer torque manager 1 tries to compensate for the disturbance. Thus, is provided for improved driver comfort when using an advanced driver assistance system, such as a pilot assist system.

Figure 3:
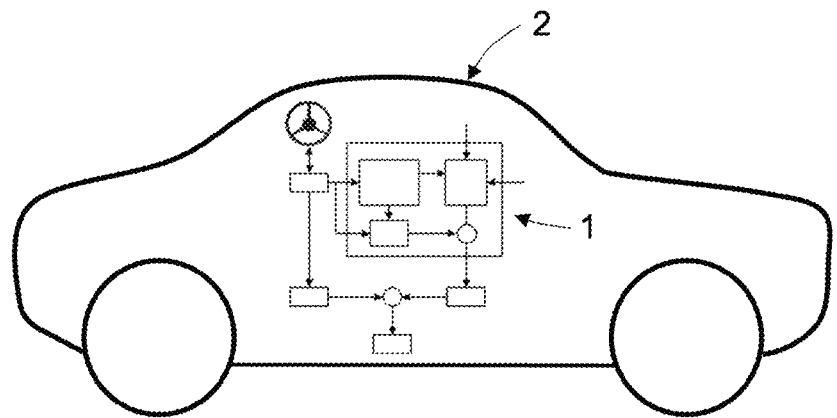
FIG. 3 is a schematic illustration of a road vehicle comprising the steer torque manager of FIG. 1 arranged in an electrical power assisted steering system thereof.

Still further envisaged herein is a road vehicle 2, as illustrated in FIG. 3, which has an advanced driver assistance system that comprises a steer torque manager 1, as described above. A road vehicle 2 that has an advanced driver assistance system that comprises a steer torque manager 1, as described above, provides for improved driver comfort when using an advanced driver assistance system 26, such as a pilot assist system.

Figure 6:
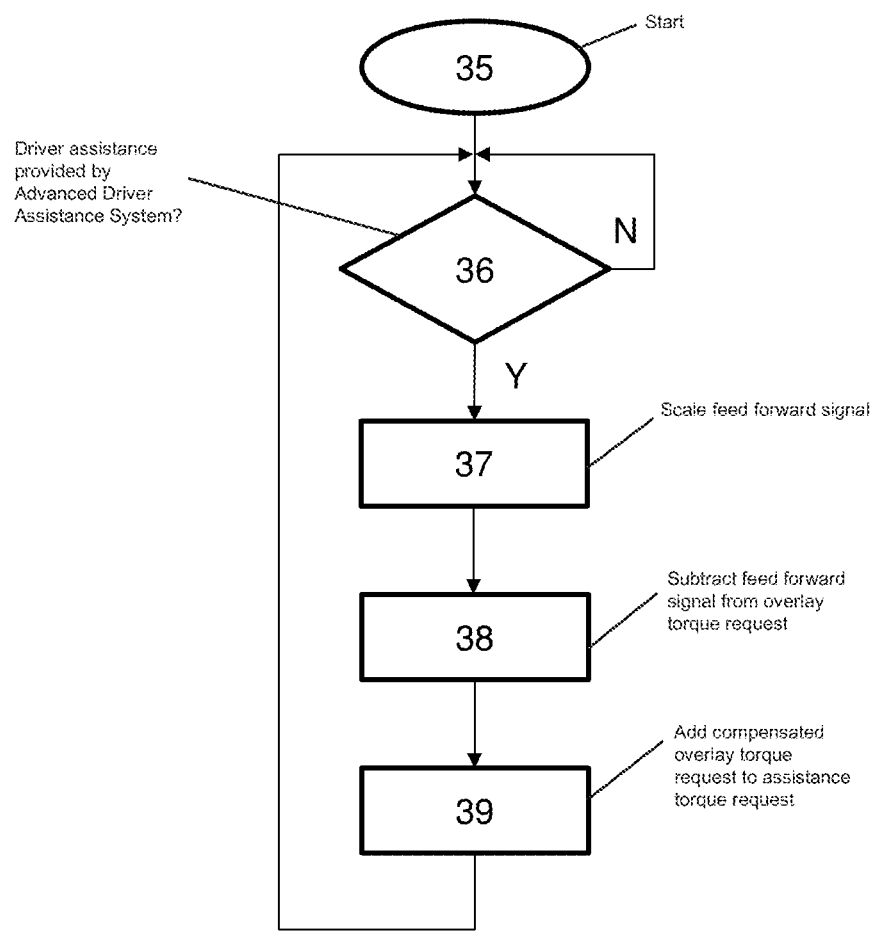
FIG. 6 is a schematic illustration of a method in a steer torque manager according to embodiments herein.

In accordance with the present application is also envisaged a method in a steer torque manager 1 for an advanced driver assistance system 26 of a road vehicle 2 having an electrical power assisted steering, as schematically illustrated in FIG. 6. The steer torque manager 1 comprises a driver in the loop functionality 13 for determining when and how to hand over control from an advanced driver assistance system 26 to a driver of the road vehicle 2. The steer torque manager 1 further comprises a wheel angle controller 14, for providing from an advanced driver assistance system 26, wheel angle request 3 an overlay torque request 17 to be added to a torque request 7 from the electrical power assisted steering. The steer torque manager 1 is further arranged to receive a steering wheel 4 torsion bar 28 torque related signal 6, here also referred to as an assistance torque related signal 6.

As schematically illustrated in FIG. 6 the method starts out at 35, next is established at 36 if driver assistance is provided by the advanced driver assistance system 26. If no driver assistance is provided the method loops back to start at 35. If driver assistance is provided the steer torque manager 1 scales at 37 a feed forward signal 21 to be a scaled version of the assistance torque related signal 6. The steer torque manager 1 then feeds forward and subtracts at 38 the feed forward signal 21 from the overlay torque request 17 provided by the wheel angle controller 14 to produce a resulting compensated overlay torque request 23, which is then added at 39 to an assistance torque request from the electrical power assisted steering 5 to provide a total torque request 11 brought to a motor controller 12 of a steering system 30 of the road vehicle 2, whereupon the method loops back to start at 35.

The compensated overlay torque request 23 may be subject to an overlay torque safety limiter 18 in order to provide a safety limited overlay torque request 19, which is then arranged to be added to an ASIL D compliant safety limited assistance torque request 9 from the electrical power assisted steering 5 in order to provide the total torque request 11 to the motor controller 12 of the steering system 30 of the road vehicle 2.

In accordance with the method, scaling of the feed forward signal 21 is done using a scale factor in the range [0,1] assuming low values if the measure of driver activity 22 indicates high driver activity and higher values if the measure of driver activity 22 indicates low driver activity. 6. Although this scaling may be continuous, as illustrated in FIG. 2, the basic principle is that modulation is performed such that:

a version of the assistance torque related signal 6 scaled by a scale factor of approximately [1] is fed forward if the measure of driver activity 22 indicates low driver activity; and a version of the assistance torque related signal 6 scaled by a scale factor of approximately [0] is fed forward if the measure of driver activity 22 indicates high driver activity.

Thus, the above method provides for allowing an inactive driver of an associated road vehicle 2, for which driver assistance is provided by an advanced driver assistance system 26, to rest his or her hands on a steering wheel 4 thereof.

Using the method, the driver may rest his or her hands on the steering wheel 4 without unintentional disturbances from the driver causing small movements of the steering wheel propagating to the total torque request 11 provided to the motor controller 12 of the steering system of the associated road vehicle 2. Without subtraction of the version of the assistance torque related signal 6 scaled by a scale factor of approximately [1] from the overlay torque request 17 provided by the wheel angle controller 14 such disturbances would otherwise cause short torque pulsations in the steering while the wheel angle controller 14 in the steer torque manager 1 tries to compensate for the disturbance. Thus, the method provides for improved driver comfort when using an advanced driver assistance system 26, such as a pilot assist system.

The above-described embodiments may be varied within the scope of the following claims.

It should be noted that the steer torque manager 1, the advanced driver assistance system 26, the electrical power assisted steering functionality or system 5, the assistance torque safety limiter 8, the motor controller 12, the steering system 30, the driver in the loop functionality 13, the wheel angle controller 14, feed forward functionality 20, overlay torque safety limiter 18, the calculating functionality 25, the power steering control module 27, the steering wheel torque sensor 29, the overlay torque motor 32, as well as any other device, unit, feature, manager, system, functionality, action, limiter, sensor, motor, controller, filter, module, arrangement, or the like described herein may comprise and/or be implemented in or by one or more appropriately programmed processors (e.g., one or more microprocessors including central processing units (CPU)) and associated memory and/or storage, which may include data, operating system software, application software and/or any other suitable program, code or instructions executable by the processor(s) for controlling operation thereof, for providing and/or controlling interaction and/or cooperation between the various features and/or components described herein, and/or for performing the particular algorithms represented by the various functions and/or operations described herein.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A steer torque manager for an advanced driver assistance system of a road vehicle having an electrical power assisted steering system, the steer torque manager comprising:
   a driver-in-the-loop functionality for determining when and how to hand over control from the advanced driver assistance system to a driver; and a wheel angle controller for providing, from an advanced driver assistance system wheel angle request, an overlay torque request to be added to a torque request from the electrical power assisted steering;

wherein the steer torque manager is configured to receive an assistance torque related signal and, when driver assistance is provided by the advanced driver assistance system, to feed forward and subtract from the overlay torque request provided by the wheel angle controller a feed forward signal scaled in a feed forward functionality to be a scaled version of the assistance torque related signal using a scale factor in the range from 0 to 1, the scale factor assuming a lower value in response to a measure of driver activity indicating a high driver activity and assuming a higher value in response to the measure of driver activity indicating a low driver activity that is less than the high driver activity;

wherein the steer torque manager is further configured to calculate the driver-in-the-loop factor as a normalized version of a driver-in-the-loop impulse, which it is arranged to calculate as a measure of driver activity over a time window where more recent values are weighted higher than older values, wherein the driver-in-the loop factor spans between indicating an inactive driver and a fully active driver.

2. The steer torque manager of claim 1 wherein the assistance torque related signal is provided as a vehicle traveling velocity dependent amplification of a steering wheel torsion bar torque.

3. The steer torque manager of claim 1 further configured to use as the measure of driver activity a driver-in-the-loop factor indicating driver activity from an inactive driver to a fully active driver.

4. The steer torque manager of claim 1 wherein the driver-in-the-loop factor is arranged to span from 1 to 0, where 1 indicates an inactive driver and 0 indicates a fully active driver for whom the overlay torque request from an advanced driver assist functionality should be faded out and control handed over from an advanced driver assistance system to a driver.

5. The steer torque manager of claim 1 wherein the feed forward signal is arranged to be scaled in the feed forward functionality to be a scaled version of the assistance torque related signal, where the scale factor is ramped up continuously from zero to one in the range from 0 to 1 in a nonlinear fashion with respect to the assistance torque related signal.

6. The steer torque manager of claim 3 wherein the driver-in-the-loop factor is rate limited.

7. The steer torque manager of claim 1 configured to receive wheel angle requests from an advanced driver assistance system comprising a pilot assist system configured to help a driver of the road vehicle to drive within a road lane while at the same time maintaining a preselected time interval to a preceding vehicle.

8. The steer torque manager of claim 1 further configured to subtract from the overlay torque request a feed forward signal scaled using a scale factor of 1 for any assistance torque related signal caused by steering wheel torsion bar torques less than 1.5 Nm when the measure of driver activity indicates low driver activity.

9. A power steering control module comprising a steer torque manager according to claim 1.

10. An advanced driver assistance system comprising the steer torque manager of claim 1.

11. A road vehicle wherein it comprises the advanced driver assistance system of claim 10.

12. A method for a steer torque manager for an advanced driver assistance system of a road vehicle having an electrical power assisted steering system, the steer torque manager comprising a driver-in-the-loop functionality for determining when and how to hand over control from an advanced driver assistance system to a driver, and a wheel angle controller for providing, from an advanced driver assistance system wheel angle request, an overlay torque request to be added to a torque request from the electrical power assisted steering, wherein the steer torque manager is configured to receive an assistance torque related signal, the method comprising:

in response to driver assistance provided by the advanced driver assistance system, having the steer torque manager feed forward and subtract from the overlay torque request provided by the wheel angle controller a feed forward signal scaled to be a scaled version of the assistance torque related signal, using a scale factor in the range from 0 to 1, the scale factor assuming a lower value in response to a measure of driver activity indicating a high driver activity and assuming a higher value in response to the measure of driver activity indicating a low driver activity that is less than the high driver activity, wherein the steer torque manager is further configured to calculate the driver-in-the-loop factor as a normalized version of a driver-in-the-loop impulse, which it is arranged to calculate as a measure of driver a activity over a time window where more recent values are weighted higher than older values, wherein the driver-in-the loop factor spans between indicating an inactive driver and a fully active driver.

* * * * *